United States Patent [19]
Cassidy et al.

[11] Patent Number: 5,121,901
[45] Date of Patent: * Jun. 16, 1992

[54] SHEATHED OPTICAL FIBRES AND METHOD OF INSTALLING SUCH FIBRES

[75] Inventors: Stephen A. Cassidy; Michael H. Reeve, both of Suffolk, England

[73] Assignee: British Telecommunications plc, London, England

[*] Notice: The portion of the term of this patent subsequent to Sep. 8, 2004 has been disclaimed.

[21] Appl. No.: 184,573

[22] Filed: Apr. 22, 1988

Related U.S. Application Data

[60] Continuation-in-part of Ser. No. 717,645, Mar. 29, 1985, Pat. No. 4,740,053, and a continuation-in-part of Ser. No. 15,113, Feb. 13, 1987, Pat. No. 4,796,970, which is a division of Ser. No. 848,950, Apr. 7, 1986, Pat. No. 4,691,896, which is a continuation of Ser. No. 551,640, Nov. 8, 1983, abandoned.

[51] Int. Cl.⁵ ............................................. B69H 59/00
[52] U.S. Cl. .......................... 254/134.4; 254/134.3 FT
[58] Field of Search ............... 254/134.3 FT, 134.3 R; 350/96.23

[56] References Cited

U.S. PATENT DOCUMENTS

| | | | |
|---|---|---|---|
| 3,610,582 | 10/1971 | Passoni | 254/134.3 FT |
| 3,793,732 | 2/1974 | Hamrick | 33/137 R |
| 4,105,284 | 8/1978 | Olshansky | 350/96.33 |
| 4,181,403 | 1/1980 | Macedo et al. | 350/96.33 |
| 4,185,809 | 1/1980 | Jonnes | 254/134.4 |
| 4,230,395 | 10/1980 | Dean et al. | 350/96.23 |
| 4,248,035 | 2/1981 | Skillen et al. | 57/6 |
| 4,332,436 | 6/1982 | Adorni et al. | 350/96.23 |
| 4,372,792 | 2/1983 | Dey et al. | . |
| 4,408,378 | 10/1983 | Ketteringham et al. | 28/289 |
| 4,446,686 | 5/1984 | Panuska et al. | 57/6 |
| 4,640,576 | 2/1987 | Eastwood et al. | 350/96.23 |

FOREIGN PATENT DOCUMENTS

| | | |
|---|---|---|
| 0135132 | 3/1985 | European Pat. Off. . |
| 2507583 | 9/1976 | Fed. Rep. of Germany . |
| 3000109 | 7/1980 | Fed. Rep. of Germany . |
| 2081764 | 2/1982 | United Kingdom . |
| 2086607 | 5/1982 | United Kingdom . |
| 2122367 | 1/1984 | United Kingdom . |
| 2122370 | 1/1984 | United Kingdom . |

*Primary Examiner*—J. J. Hartman
*Attorney, Agent, or Firm*—Nixon & Vanderhye

[57] ABSTRACT

A sheath for optical fibres comprises a compound sheath having an inner sheath of high modulus and density. and an outer sheath layer of low density material. The outer sheath layer may be of foamed polyethylene and the inner sheath of polypropylene, both conveniently formed by extrusion. Such fibre members are installed by first installing a conduit having one or more bores and subsequently inserting the flexible, lightweight optical fibre members containing the optical fibres into the bores. The optical fibre members are propelled by employing the fluid drag of air, or another suitable gas, passed at high velocity through the bores.

22 Claims, 5 Drawing Sheets

SHEATHED OPTICAL FIBRES AND METHOD OF INSTALLING SUCH FIBRES

RELATED APPLICATIONS

This is a continuation-in-part of Ser. No. 717,645, filed Mar. 29, 1985, now U.S. Pat. No. 4,740,053, and is a continuation-in-part of Ser. No. 015,113, filed Feb. 13, 1987, now U.S. Pat. No. 4,796,970, which latter application is a division of Ser. No. 848,950, filed Apr. 7, 1986, now U.S. Pat. No. 4,691,896, which in turn is a file wrapper continuation of Ser. No. 551,640, filed Nov. 8, 1983, abandoned.

BACKGROUND OF THE INVENTION

This invention relates to optical fibers and in particular, sheathed optical fibers and a method for their installation.

A method of installing optical fiber transmission lines is disclosed in European patent application No. 83306636.8 (Title: Optical Fiber Transmission Lines, Applicants: British Telecommunications, Inventors; M. H. Reeve and S. A. Cassidy and corresponding to U.S. Pat. No. 4,691,896, which patent is hereby expressly incorporated by reference), which utilizes the drag forces generated by gas flow to propel optical fiber transmission lines through tubular installation pathways, for insertion or withdrawal of such lines. The optical fiber transmission lines usually comprise optical fiber members in which one or more optical fibers are enclosed in a common jacket.

It is an object of the present invention to provide optical fiber members especially suited for use with the aforesaid method of installation. The method of installation as set forth in U.S. Pat. No. 4,691,896 is described in detail herein.

Optical fiber cables carrying optical fiber transmission lines have heretofore been installed by the same methods as conventional metal conductor cables, those methods usually involving pulling the cable with a pulling rope through a previously laid cable duct. Frequently, the cable duct already contains one or more conventional cables at the time of installing the optical fiber cable.

Unlike the metal conductors of a conventional cable, the optical fibers are easily damaged by tensile stress. Such stress may, for example, propagate micro-cracks, leading to fiber breakage in the long term. It is, therefore, standard practice to reinforce optical fiber cables by providing a central strength member, usually one or more steel tension wires, about which the optical fibers are disposed. The strength member takes up, and thus increases the ability of the cable to withstand, tensile stresses accompanying installation of the cable.

Unfortunately, the central strength member usually provides insufficient protection against local stresses caused by pulling a further cable through the same duct. The conventional approach of installing at the outset optical fiber cables containing sufficiently large numbers of optical fibers to satisfy foreseeable future traffic demands is a way of overcoming this problem. In consequence, first time installation of optical fiber cables containing dozens or even hundreds of optical fibers are currently envisaged despite the fact that to begin with a small fraction of the installed fibers would provide ample traffic carrying capacity. A further reason for installing optical fiber cables of comparatively large dimension is that the smaller the cross-section of the cable the more prone the cable becomes to wedging in between those cables already present in the duct.

The first time installation of large diameter optical fiber cables with high numbers of optical fibers, is, however, undesirable for a variety of reasons. Firstly, there are problems of a technical nature inherent in such cables, such as for example, the difficulty of forming joints and of achieving the required high strength-to-weight ratios. Secondly, there are clear economical drawbacks in committing large resources to install initially unused fiber capacity, particularly in view of the comparatively recent origins of optical fiber technology which lead one to expect continued substantial reductions in the price and improvement in the quality of optical fibers. Thirdly, there is the serious risk of damaging in a single incident very large numbers of expensive optical fibers and, finally, there is an appreciable loss in flexibility when routing high density optical fiber transmission lines.

A method of installing optical fibers with pulling ropes and pull chords is described in "Sub-ducts: The Answer to Honolulu's Growing Pains", Herman S. L. Hu and Ronald T. Miyahara, Telephony, 7 Apr. 1980, pp 23 to 35. The installation method described there proceeds as follows: A section of existing 4-inch (100 mm) duct is rodded and thereafter between one and three individual 1-inch (25 mm) polyethylene tubes are inserted into the duct using pulling ropes. The polyethylene tubes form sub-ducts into which an optical fiber cable can be pulled with the aid of a nylon pull chord which has previously been inserted into the sub-duct by means of a parachute attached to its leading end and pushed through the subduct with compressed air.

The method just referred to does deal with some of the problems discussed above, but only to a very limited extent. Thus, it enables fiber capacity to be increased in up to three stages, and separates the optical fiber cables from those cables already in the duct, thereby greatly reducing the likelihood of jamming, and hence overstressing, of the optical fiber cable.

It is an object of the present invention to overcome, or at least appreciably mitigate the majority of the aforementioned problems of installing optical fiber transmission lines.

It is another object to provide a method of installing optical fiber transmission lines which is comparatively simple and yet flexible and economical.

According to the present invention a method of advancing a lightweight and flexible optical fiber member along a tubular pathway comprises propelling the fiber member along the pathway by fluid drag of a gaseous medium passed through the pathway in the desired direction of advance.

It will be appreciated that to generate sufficient fluid drag to propel the fiber member, the gaseous medium has to be passed through the pathway with a flow velocity much higher than the desired rate of advance.

The terms "lightweight and flexible" in respect of the optical fiber member are to be understood as meaning "sufficiently lightweight and flexible" for the fiber member to be propelled by the fluid drag.

Whether the fiber member is sufficiently lightweight and flexible and the flow velocity sufficiently high is readily determinable by a simple trial and error experiment, guided, if necessary, by the theoretical model discussed below.

The flow velocity of the gaseous medium may be steady or may be suitably varied, for example either between a first velocity producing no, or insufficient, fluid drag to propel the fiber member, and a second velocity producing sufficient fluid drag to propel the fiber member, or between a first and a second velocity both producing sufficient fluid drag for propelling the fiber member. Conveniently, the variations in velocity take the form of repeated abrupt changes between the first and second velocity.

The aforementioned variations in flow velocity may include periods during which the flow is reversed with respect to the desired direction of advance of the fiber member.

It is to be understood that more than one fiber member may be propelled along the same tubular pathway.

A fiber member may, for example, comprise a single optical fiber, protected by at least a primary coating but preferably contained within an outer envelope. Alternatively, a fiber member may comprise a plurality of optical fibers contained within a common envelope.

The envelope may be loosely or tightly surrounding the fiber or fibers.

The method may be used for insertion of an optical fiber member into, or its withdrawal, from the pathway.

The gaseous medium is chosen to be compatible with the environment in which the invention is performed, and in ordinary environments will be a non-hazardous gas or gas mixture.

With the proviso about compatibility with the environment, the gaseous medium is preferably air or nitrogen.

The tubular pathways and/or the fiber members are conveniently but not necessarily of circular cross-section, and the fiber member is always smaller than the pathway.

In practice the pathway internal diameter will generally be greater, and frequently much greater than 1 mm, and the external diameter of the fiber member greater than 0.5 mm.

A preferred range of diameters for the pathway is 1 to 10 mm, conveniently between 3 and 7 mm, and a preferred range of diameters for the fiber members is 1 to 4 mm, although much larger diameters may be used provided the fiber member is sufficiently lightweight and flexible. The diameter of the fiber members is preferably chosen to be greater than one tenth, and conveniently to be about one half of the pathway diameter of greater (and appropriately less, or course, if more than one fiber member is to be propelled through the same pathway).

Insertion of a fiber member by means of the fluid drag of a gas passing over the fiber member has several advantages over methods involving pulling an optical fiber cable with a pull cord.

Firstly, the extra step of providing a pull cord is eliminated.

Secondly, using the fluid drag of a gaseous medium produces a distributed pulling force on the fiber member. This is particularly advantageous if the installation route contains one or more bends. If, as would be the case with a pulling cord, the pulling force were concentrated at the leading end of the fiber member, any deviation of the pathway from a straight line would greatly increase friction between the fiber member and the internal walls of the pathway, and only a few bends would be sufficient to cause locking the fiber member. The distributed pulling force produced by the fluid drag, on the other hand, enables bends to be negotiated fairly easily, and the number of bends in a given installation is no longer of much significance.

Thirdly, the fluid drag substantially reduces overall pulling stress on the fiber member and so permits the fiber member to be of relatively simple and cheap construction.

Furthermore, because the fiber member is not subjected to any substantial pulling stress during installation, little allowance, if any, needs to be made for subsequent relaxation.

According to a further aspect of the present invention, a method of installing an optical fiber transmission line comprises installing a conduit having one or more ductlets providing tubular pathways and, after installation of the conduit, inserting by the aforesaid method using fluid drag one or more fiber members into the associated ductlets as required.

Installing optical fiber transmission lines by this method has several advantage over conventional techniques.

Firstly, since the conduit is installed without containing any optical fibers, conventional rope pulling and similar techniques may be freely employed for installing the conduit.

Secondly, the capacity of a transmission line can readily be adapted to requirements. Thus, while initially only one or two fiber members may be sufficient to carry the traffic the conduit may contain a much larger number of ductlets than are required at the time of installation, and further fiber members may be inserted later on as and when needed. The conduit of the present invention is cheap compared to the cost of the fibers, and spare ductlets to accommodate further fibers as and when extra capacity is required can thus be readily incorporated without adding more than a small fraction to overall costs.

The method of the present invention also permits the installation of improved later generations of optical fiber transmission lines. It is possible, for example, to install at first one or more fiber members incorporating multimode fibers, and at a later date add, or replace the installed multimode fiber members with fiber members incorporating monomode fibers. Installed fiber member may conveniently be withdrawn from the ductlet, and replacement fiber members be inserted by using the aforesaid method of propelling by fluid drag of a gaseous medium.

According to yet another aspect of the present invention, an optical fiber cable comprises a conduit including one or more ductlets forming tubular pathways and capable of loosely accommodating an optical fiber member, and an optical fiber member, and at least one optical fiber member inserted by the aforementioned method using fluid drag. The conduit may be rigid or flexible.

Where the conduit includes more than one ductlet, the ductlets are conveniently formed by bores in the material of the conduit. The term "bore", like the word "tubular" is understood in this context to include circular and other suitable shapes of cross-sectional area.

Alternatively, the conduit may comprise a plurality of individual tubes enveloped by a common outer sheath.

It will be appreciated that the present invention largely avoids the risk, inherent in handling optical fiber cables with a large number of fibers, of accidentally damaging before or during installation in a single event a large number of expensive optical fibers.

The present invention also enables the installation of continuous optical fibers over several installation lengths without joints.

Furthermore, individual fiber members routed through the conduit can be routed, without requiring fiber joints, into different branch conduits at junction points.

According to the present invention, an optical fiber member which is particularly suited for the aforementioned method of installation includes a sheath comprising an inner sheath containing one or more optical fibers, and an outer sheath containing the inner sheath, wherein the inner sheath comprises material of a first elasticity modulus, wherein the outer sheath comprises material having a second elasticity modulus and low density, and wherein the first modulus is high as compared to the second modulus.

The outer sheath is conveniently directly adhered to the inner sheath.

The inner sheath may be in the form of a matrix of sheathing material containing the fiber or fibers. Alternatively, the inner sheath may comprise a sleeve surrounding the fiber or fibers.

The inner sheath may loosely surround the fiber or fibers, but preferably forms a tightly fitting envelope to the fiber or fibers.

The inner sheath may comprise a coating applied to the optical fiber or fibers. Alternatively, the inner sheath may be formed by extrusion about the fiber or fibers.

The outer sheath layer is conveniently formed by extrusion about the inner sheath.

The outer sheath suitably comprises cellular material of low density and is preferably of a substantially greater cross-sectional area than the inner sheath.

The material of the outer sheath preferably has an elasticity modulus of between $10^7$ and $10^8$ $Nm^{-2}$.

In a preferred form of the present invention the sheath comprises an inner sheath in the form of a thin annular sleeve of relatively high density polymer, and an annular outer sheath enclosing the inner sheath and formed of relatively low density foamed polymer. Where the sleeve contains a plurality of optical fibers, the sleeve conveniently fits sufficiently tightly for the enclosed optical fibers to be closely packed.

While conventionally constructed fiber members have been used successfully for installation by the technique disclosed in U.S. Pat. No. 4,691,896, the applicants have found that by employing fiber members according to the present invention improvements such as, for example, greater continuous installation lengths, reduced likelihood of damage to the optical fiber or fibers, etc, can be achieved. In the following detailed description, initially these fiber members are described followed by a description of the above-described method of installation.

BRIEF DESCRIPTION OF THE DRAWINGS

The invention will now be described further by way of example only and with reference to the accompanying drawings, in which.

DETAILED DESCRIPTION OF THE DRAWINGS

Figure 1:
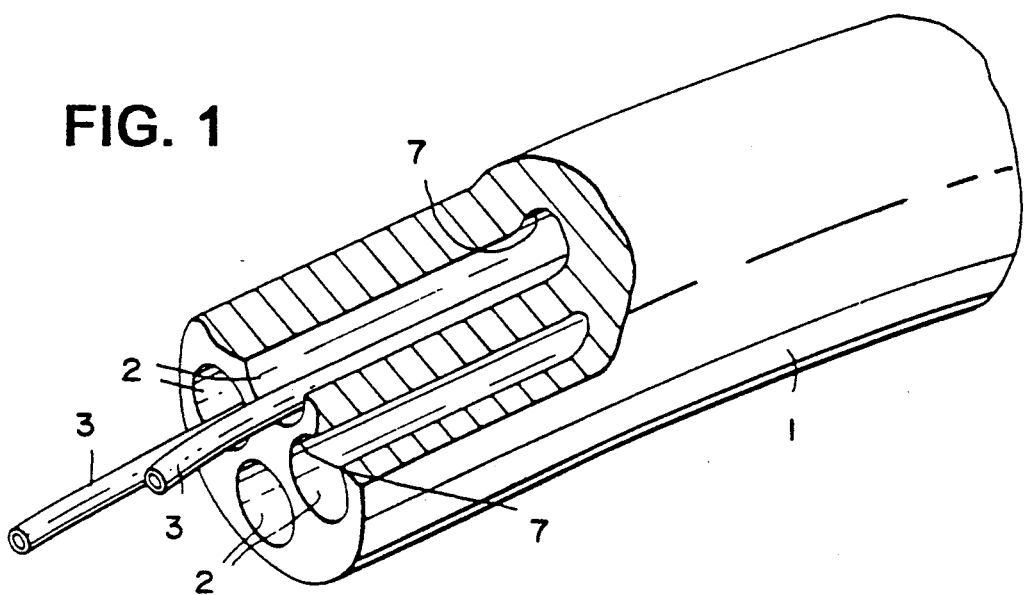
FIG. 1 is a schematic cut-away drawing of a conduit such as may be used with the method of U.S. Pat. No. 4,691,896, and optical fiber members of the kind provided in accordance with the present invention located therein.
Figure 2:
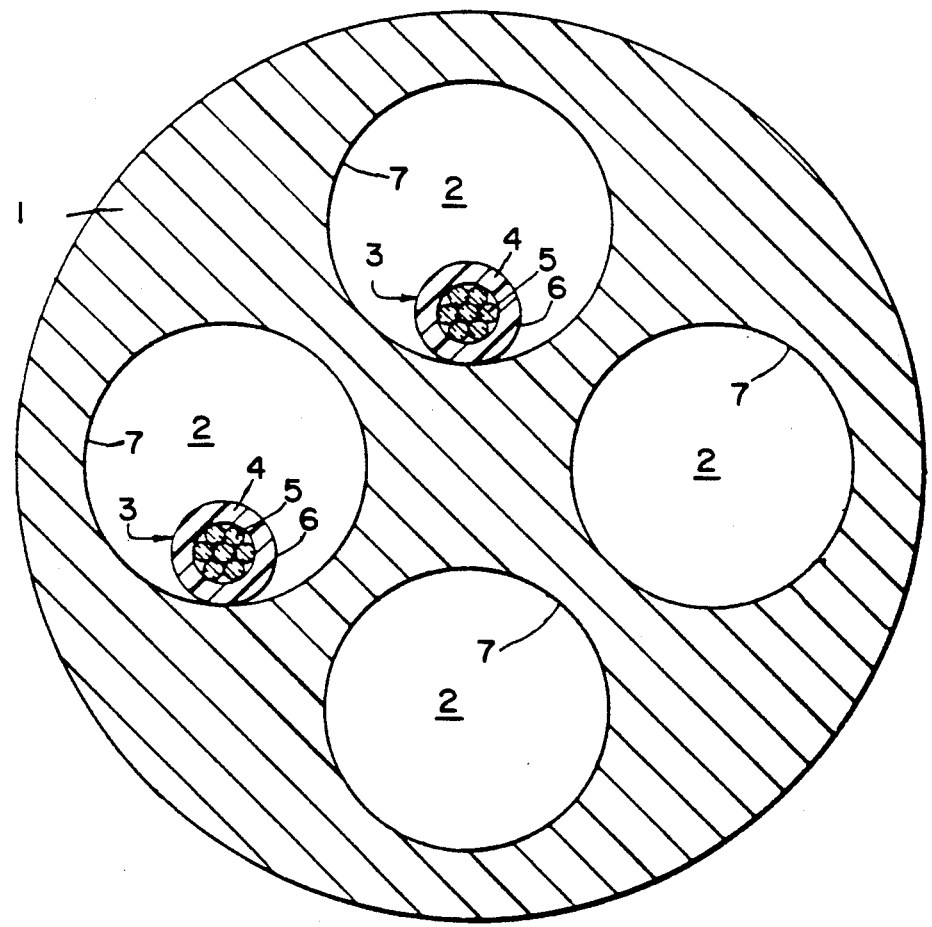
FIG. 2 is an enlarged cross-section of the conduit and optical fiber members of FIG. 1.

Referring first to FIGS. 1 and 2, a conduit 1 comprises one or more tubular pathways 2 and carries a plurality of optical fiber transmission lines provided by optical fiber members 3. The structure shown in FIGS. 1 and 2 enable insertion and/or withdrawal of the optical fiber members 3 by the method of U.S. Pat. No. 4,691,896, that is to say, by passing a gas, usually air, through the pathways 2. The drag forces on the fiber members 3 generated by the passage of the gas propel the optical fiber members 3 through the pathways 2.

Figure 3:
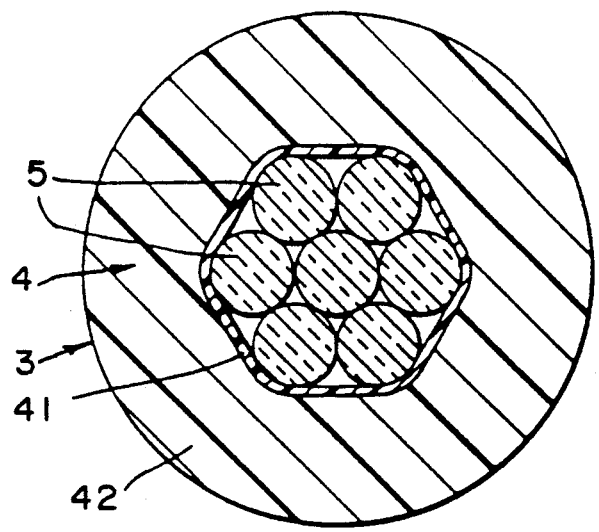
FIG. 3 shows a further enlarged cross-section of the optical fiber member of FIG. 2.

Referring now also to FIG. 3, the optical fiber members 3 comprise, in this instance, seven optical fibers 5 enclosed in a common sheath 4. The sheath 4 comprises an inner sheath 41 sufficiently tightly surrounding the optical fibers 5 for the fibers 5 to be closely packed, and an outer sheath 42 surrounding the inner sheath 41.

The inner sheath is formed of relatively high density material having a relatively high modulus of elasticity, while the outer sheath layer 42 is formed from cellular, relatively low density material having a relatively low modulus of elasticity.

More specifically, a fiber member as shown in FIG. 3 was manufactured as follows, using as outer sheath material a cellular polymer which is light and flexible.

Optical fibers 5 having an approximate overall outside diameter, including a protective coating of ultra violet light-cured acrylate, of 0.25 mm each, were enclosed in a sheath 4 comprising a thin inner sheath layer 41 and a thick outer sheath layer 42. The inner sheath 41 had a thickness of between 0.1 and 0.2 mm, and the outside diameter of the outer sheath 42 was of the order of 2 mm. The inner sheath 41 was formed from polypropylene, and the outer sheath 42 from foamed polyethylene. The material for the outer sheath 42 was obtained from BXL Ltd., of Grangemouth Works, Inchyra Road, Grangemouth, Stirlingshire, United Kingdom, product number DFDK 4960. The sheaths 41 and 42 were applied in the form of a coating by successive extrusion, with the inner sheath 41 extruded first about the optical fibers 5 followed by extrusion of the outer sheath 42 about the inner sheath.

The extrusion may be performed in successive extrusion heads of a single extrusion path.

It may further be advantageous to coat the fibers 5 with an ultraviolet light curable coating material prior to extruding the inner sheath, and to cure the coating material at some time after extrusion.

It is important that throughout the range of operating temperatures, the modulus and shrinkage of the sheath are such that the resulting compressive force on the fiber is insufficient to cause buckling of the fiber.

The following theoretical model is intended to provide some guidance to selecting appropriate sheath parameters. The calculations are based on an optical fiber having a modulus $E=7.3\times10^{10}$ Nm$^{-2}$ and moment of area $I=1.2\times10^{-17}$m$^4$.

The case of a single fiber enclosed in a sheath in the form of a coating will be treated first, in which the layer forming the outer sheath has a modulus of $a=4\times10^7$Nm$^{-2}$, and the layer forming the thin inner sheath has a modulus of about $10^9$Nm$^{-2}$.

Using a standard result from the field of elastic stability, the compressive force $T_c$ necessary to cause sudden buckling of the fiber is given by $$T_c = EI\pi^2n^2/l^2 + al^2/\pi^2n^2$$

where n is the integer which minimizes $T_c$.

$\pi n/l$ corresponds to the wavenumber, k, of this buckling. This can be thought of as continuous if n is large (i.e., $n/l \cong (n+1)/l$). Therefore T can be found to have a minimum at $k=\sqrt[4]{(a/EI)}$, which gives $T_c$ for one fiber = 12 N, and the corresponding buckling wavelength 2.4 mm. A 9.5% strain in the formed sheath 42 would be sufficient to buckle a perfectly straight fiber in a perfectly concentric coating. In practice the critical force is appreciably lower because the package is neither perfectly straight nor concentric, and the transverse modulus is in practice also much lower than the value adopted here for the purposes of calculation since the foam has a finite thickness, and so is able to bend as well as deform. Nevertheless, the calculated figures are considered to permit useful comparison and to provide an acceptable order of magnitude estimate of the critical buckling forces.

Within an order of magnitude these forces are present due to the foam shrinkage, and a single fiber so coated was found to buckle.

If bending of an assembly of seven fibers is treated as behaving like seven independent fibers, I is increased by a factor of 7, giving $$T_c = 31.4 \, N$$

implying a coating strain of 25%.

If, however, the seven fibers are locked together and bend as a single entity, then $EI \cong 10^{-4}$, and $$T_c = 126 \, N$$

which is well over an order of magnitude larger than the forces available, and so the fibers are extremely unlikely to buckle.

There is therefore an advantage in locking the fibers together into a fixed matrix, even though in practice there will probably be as small slippage between the fibers.

During one sheathing process, one fiber was monitored for strain using the single ended frequency domain technique described in R. Kashyap, M. H. Reeve, "Single ended fiber strain and length measurement in frequency domain" Electronics Letters Vol. 16. No. 18 Aug. 1980. The strain on the fiber was found to be compressive, and of magnitude 0.034%. This implies that the foam is under a strain of about 1.6%, which confirms the above assumptions about the order of magnitude of the compressive forces on the fibers.

The fiber member was installed, by the method of U.S. Pat. No. 4,691,896 into a test route consisting of 100 m flexible conduit providing a tubular pathway of 6 mm bore diameter, the conduit having been wound onto a drum of 0.5 m diameter. The installation required 30 psi of air pressure.

The fiber member described here with reference to FIG. 3 with seven fibers has been found to be not only suitable for installation by the technique of U.S. Pat. No. 4,691,896, but also to provide good loss and temperature performance.

Figure 4:
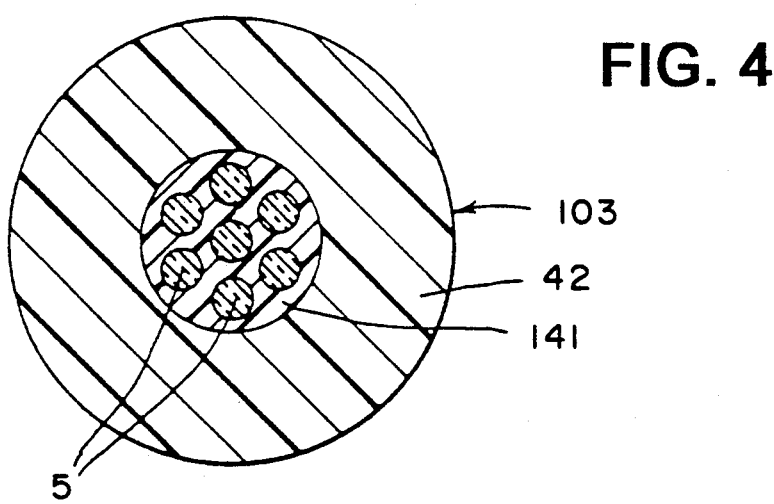
FIGS. 4 and 5 show enlarged cross-sections of further optical fiber members according to the present invention.

FIG. 4 is a cross-section of a fiber member 103 which differs from that of FIG. 3 in that the inner sheath does not take the form of the thin layer 41—instead, the fibers 5 are coated when pristine with a coating 141 which forms a matrix in which the fibers are embedded. In this manner, good adhesion is provided between the optical fibers 5 as well as a suitable surface onto which to extrude the outer sheath 42. Thus, the inner sheath 141 of the optical fiber member 103 is now provided by the coating 141 in which the optical fibers 5 are embedded.

In order to reduce stress on individual fibers caused by contraction of the sheath, for example, after completion of insertion by the method of U.S. Pat. No. 4,691,896, or on account of temperature variations, the inner sheath 41, 141 is in intimate contact with the optical fibers 5, utilizing the combined high compression modulus of all the fibers 5. In the fiber member of FIG. 3 the radial compression by the inner sheath 41 causes sufficient frictional contact between the fibers 5 to ensure combined resistance to longitudinal compression, while in the case of the embodiment of FIG. 4 this is achieved by embedding the fibers 5 in the inner sheath 141.

Figure 5:
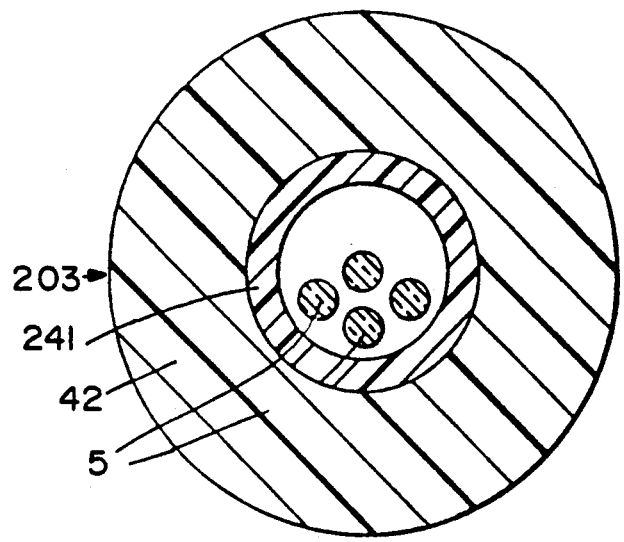

In the case of the optical fiber member 203 shown in cross-section in FIG. 5, the inner sheath, which as before is surrounded by the outer sheath 42, is a loosely fitted sleeve 241. In this embodiment the inner sheath 241 by itself serves to resist shrinkage of the outer sheath and its compression modulus will thus have to be greater than in the embodiments of FIGS. 3 and 4, as no use is made of the high compression modulus of the optical fibers themselves.

In order to avoid placing any appreciable strain on the fibers, the moduli of the inner sheath 41, 141, 241, and the outer sheath layer 42 may be chosen such that the overall expansion coefficient of the whole sheath is practically negligible or matched to the fiber expansion coefficient. This may be achieved, for example, by forming the inner sheath 41 of a material having a negative temperature coefficient, e.g., an orientated polymer such as a thermotropic liquid crystal polyester having the properties described in "Temperature desensitization of delay in optical fibers for sensor applications", S. Hornung et al, Electronics Letters, 42 Nov. 1983, Volume 19, No. 24 pp 1039-1040.

The material for the outer sheath layer 42 may advantageously be chosen to accept antistatic agents, antifriction agents and the like, to lessen static adhesion and friction respectively between the sheath and the wall of the tubular pathway during insertion.

Figure 6:
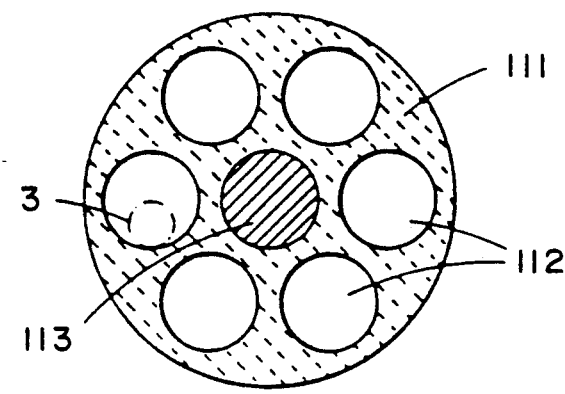
FIG. 6 is a cross section through a conduit suitable for implementing the invention.

Referring to FIG. 6, as an alternative to conduit 1 shown in FIG. 1, FIG. 6 shows conduit 111 incorporating six ductlets 112, one of which contains a fiber member 3, such as described above, and a core 113.

The conduit 111 is made of extruded polymer or other suitable material, the ductlets, or bores, 112 being formed in the conduit during its extrusion. The central core 113 contains copper wire pairs required for testing operations during and after installation, repeater supervision, power supply, and the like. Alternatively, or additionally, the core 113 may incorporate reinforcements, for example tension wires, to take up the tension forces during installation of the conduit.

Where required, the conduit may be surrounded by a water barrier (not shown).

The copper wire pair for testing can be omitted from the core 113 if suitable alternative testing facilities are available, such as, for example testing methods using optical fibers inserted subsequently into the conduit as described below.

As noted above, FIGS. 3 through 5 show cross-sections through a fiber members which are in a form particularly suited for installation by fluid drag. In certain circumstances it may be desirable to provide a reinforced fiber member, by providing a tubular strength member surrounded by optical fibers as described in U.S. Pat. No. 4,691,896.

The installation of an optical transmission line as described in U.S. Pat. No. 4,691,896 proceeds as follows:

The flexible conduit 111 is installed into an existing duct (not shown) by conventional methods such as pulling with a pulling rope.

Because the conduit 111 does not contain any optical fibers at this stage, the conduit 111 can be handled in the same way as an ordinary cable, and no special care needs to be taken over and above that customary in installing conventional metal conductor cables. If required, it is also possible at this stage, that is before the conduit contains any optical fibers, to pull a further conduit through the duct to provide spare capacity.

Furthermore, since the conduit can readily be made of an external diameter matching that of cables already in the duct, wedging is less likely to occur than with a standard, smaller diameter optical fiber cable.

Once installed, optical fiber members such as 3, 103, and 203 shown in FIGS. 3-5 are inserted into as many of the ductlets 112 as is required. Instead of the aforedescribed fiber members 3, 103 and 203 being of near circular cross-section, the fiber members may, for example, be so-called ribbons, in which a thin, wide sheath encloses an optical fiber or a plurality of optical fibers lying in the same plane.

Manufacture of the conduit 111 is cheap compared to the optical fibers in the fiber members 3, 103, and 203 which it is designed to carry, and spare ductlets 112, for future expansion can readily be incorporated at the extrusion stage of the conduit 111 without adding unduly to the overall cost. The conduit may be manufactured by adapting conventional cable manufacturing processes such as, for example, extrusion.

A gas flowing past the surface of a solid object produces a drag force which largely depends on the velocity of the gas relative to the surface. The applicants have found that this drag force can be made sufficiently large to pull a lightweight optical fiber member 3, 103, or 203 into a tubular pathway such as, for example, a ductlet 112 of the aforementioned conduit 111.

In experiments, the flow velocity, or the flow rate, of air through a given pathway has been found to depend approximately linearly on the pressure difference between opposite ends of the pathway, with the slope of the dependency indicating that flow at useful flow rates is predominantly turbulent.

For a given pressure difference, the flow rate varies with the size of the free cross sectional area of the bore, while the drag force on a fiber member present in a bore varies with the flow rate and the surface area of the fiber member. The drag force has been optimized in experiments by varying these parameters and, in particular, by choosing an appropriate ratio of bore diameter to fiber member diameter.

Experiments have been performed using a bore diameter of 7 mm. The optimum fiber member diameter for this bore size has been found to lie between 2.5 and 4 mm. A pressure below 80 psi (approximately 5.6 kgs/cm$^2$), usually about 40 p.s.i. has been found sufficient to insert fiber members of up to 3.5 gram per meter (gr/m) over lengths of 200 meters. A fiber member with 2 gr/m is easily installed over this length.

The theoretical value for the drag forces for these dimensions has been calculated in the manner described below with reference to FIG. 9 to be 2.5 gr/m. Lower practical values are believed to be due to the tendency of the fiber members 3, 103, 203 to acquire "set" while on the supply reel. This set would appear to force the fiber member 3, 103 and 203 against the wall of the bore 112, thereby increasing the friction.

Suitable texturing or shaping of the fiber member surface may lead to drag forces higher than those presently experienced.

It should be noted here that using fluid drag to insert fiber members into tubular pathways differs significantly from the method described in the above mentioned article of inserting pull cords by means of parachutes. The parachute is propelled by the pressure difference between the air in front of and the air behind the parachute, and the velocity of the air relative to the advancing cord is only minimal and the pulling force is localized at the point of attachment of the parachute. In contrast, using fluid drag requires a relatively high flow of fluid relative to the surface of the fiber members.

Also, unlike the use of parachutes or potential other methods of inserting fiber members into the tubular pathways, using fluid drag produces a uniformly distributed pulling force on the fiber member. This reduces the strain on the optical fibers within the fiber member to very low values.

In ordinarily pulling a fiber member through a bend enclosing an angle e, the tension of the leading end, $T_2$ is related to the tension $T_1$ at the trailing end $T_2/T_1 = e^{\mu e}$ where $\mu$ is the coefficient of friction. Even a small number of bends in the pathway may therefore result in an unacceptably high force being required at the leading end if locking of the fiber member is to be avoided. In contrast, the distributed pulling force produced by fluid drag is applied evenly along the fiber member, including in bends, and permits a large number of bends to be easily and speedily negotiated without any undue stress on the fiber member.

Figure 7:
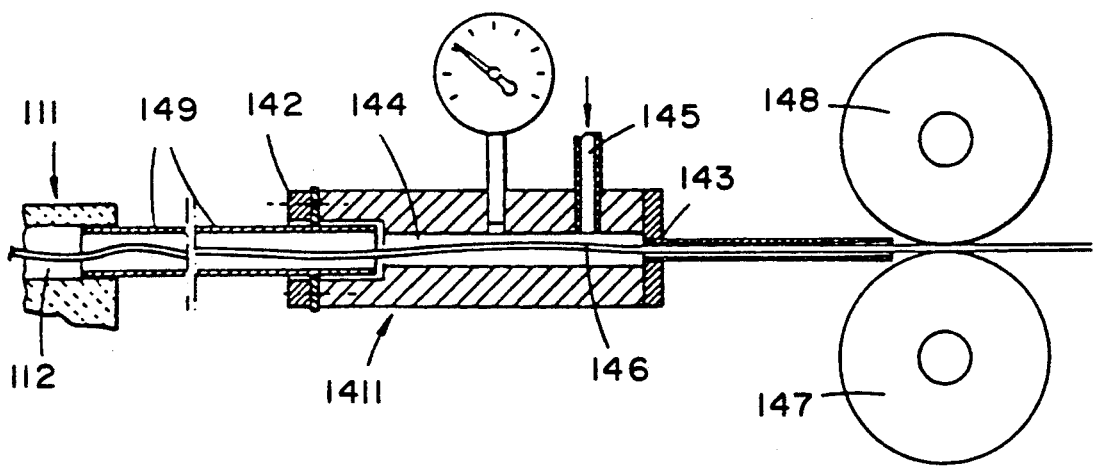
FIG. 7 is a schematic diagram of apparatus for inserting fiber members into ductlets by fluid drag.

FIG. 7 illustrates apparatus for feeding fiber members into tubular pathways such as the ductlets 112 of the conduit 11 of FIG. 1. The apparatus consists of a feedhead 1411 which contains a straight bore 144 connected at one end, its outlet end 142, to a flexible tube 149, and at the other end, its inlet end 143, to a supply reel (not shown). The head 1411 also contains an inlet 145 for air. The outlet end 142 and the bore 144 are substantially larger in cross sectional area than fiber member 146. The aperture of the inlet end 143 is only slightly larger in cross sectional area than that of the fiber member 146. This arrangements forms an air block which present a relatively large flow resistance to air and helps prevent air escaping through the inlet duct 143. The tube 149 is inserted into one of the ductlets of the conduit 111.

Suitable seals between the feedhead 1411 and the tube 149, and the tube 149, and the ductlet 112 prevent undesirable escape of the air.

In use the fiber member 146 is fed into the inlet end 143 of the feedhead 1411 by means of a pair of rubber drive wheels 147 and 148, driven by a constant torque driving mechanism (not shown). Air is fed into the bore 144 through the air inlet 145 and hence is directed through the tube 149 into the ductlet 112. The optical fiber member 146 is pushed through the inlet end 143 of the feedhead into the bore 144 and onwards into the tube 149. Pushing of the fiber member 146 continues until the surface area of the fiber member which is exposed to the air flow is sufficiently large to produce a drag force to cause the further advance of the fiber member 146 through the tube 149 and the ductlet 112, while the rate of feed is controlled by means of the aforementioned rubber drive wheels 147 and 148.

Figure 8:
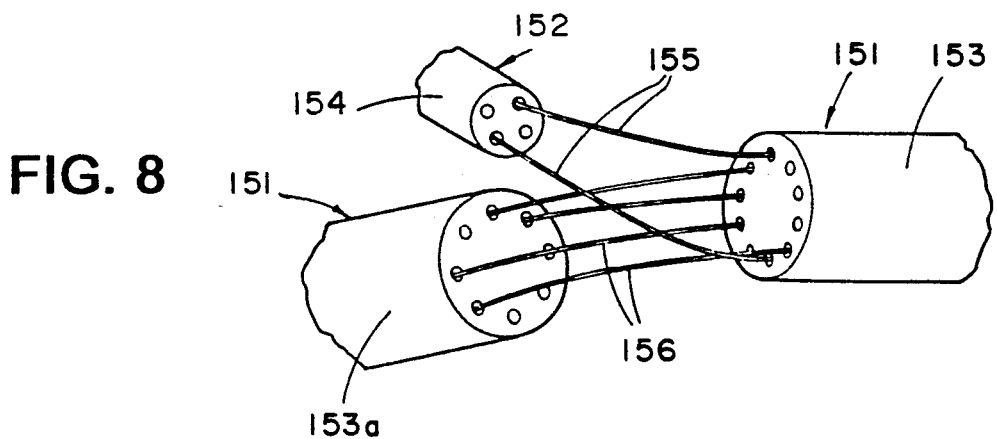
FIG. 8 is a schematic drawing of a junction between a trunk and a branch conduit.

FIG. 8 shows a branching connection between an optical fiber trunk line 151 and a branch line 152, each comprising a conduit 153 and 154 respectively and one or more fiber members 155 and 156. Since, as described above, the fiber members are individually inserted into the ductlets of the trunkline conduit 153, individual fiber members can be routed from the trunk conduit 153 into the branch conduit 154 as required, while other fiber members 156 continue to the adjacent section 153a of the trunkline conduit.

Figure 9:
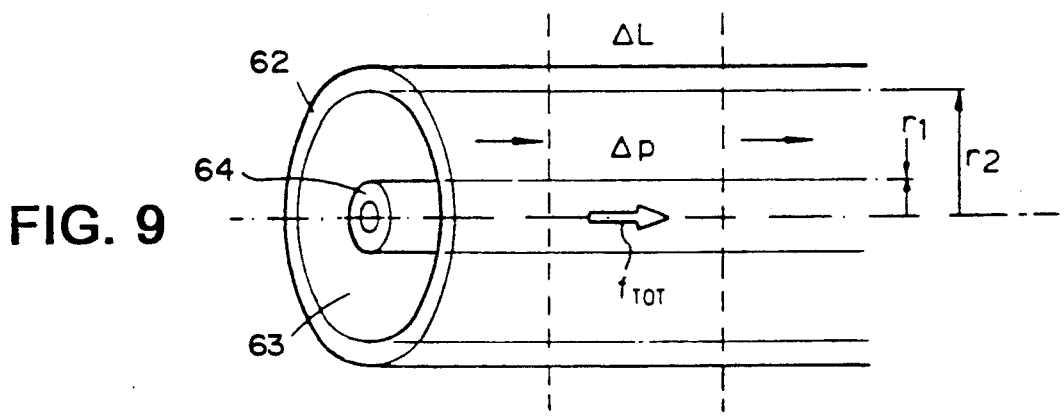
FIG. 9 is a schematic diagram to illustrate notation used in drag force calculations.

Referring now also to FIG. 9, the drag force on the fiber member 164 with the bore 163 of a ductlet, or tube, 162 on account of turbulent air flow through the bore 163 can be calculated as discussed below.

These calculations show that what has been called fluid drag or drag force above is, in fact, a composite force, of which the major proportion is normally due to viscous drag, and at least one other important component due to a hydrostatic force, f' below. It will be appreciated that the exact composition of the drag force does not affect the principles of the invention but the more detailed analysis below can be used to optimize the parameters involved in carrying out the invention, and to obtain some guidance for trial and error experiments.

The pressure difference between the tube ends can be equated to a shear force distributed over the inner surface of the bore 163 and the outer surface of the fiber member 164. Thus, one has, for a small element of length $\Delta l$ producing a pressure drop $\Delta p$.

$$\Delta p \pi (r_2^2 - r_1^2) = F$$

where $r_2$ = outer tube bore radius, $r_1$ = inner tube radius and F is the viscous drag force on the inner and outer walls of the elemental length.

If it is now assumed that the force F is distributed evenly over the area of the inner and outer walls, that is to say the external wall of the fiber member and the internal wall of the ductlet respectively, the drag force, f, on the fiber member per unit length is:

$$f = \frac{F}{\Delta l} \left[ \frac{2\pi r_1}{2\pi (r_1 + r_2)} \right] \frac{\Delta p}{\Delta L} r_1(r_2 - r_1) \quad (2)$$

which gives, in the limit, the drag force on the fiber member per unit length, $$f = \pi r_1 (r_2 - r_1) \frac{dp}{dl} \quad (3)$$

In addition, we must consider the force produced by the pressure difference acting on the cross-sectional area of the fiber member. This is locally proportional to the pressure gradient and therefore is distributed over the installed length of the fiber member in the same way as the viscous drag force, leading to an additional force $$f' = \frac{\Delta p}{\Delta l} \pi r_1^2 \quad (4)$$

giving a total force per unit length of $$f_{TOT} = \frac{dp}{dt} \pi r_1 r_2 \quad (5)$$

In order to get an initial estimate of this it is assumed that the pressure drops linearly over the length of the bore, whether filled by the fiber member or not. Equation 5 is then plotted, for the case of the 6 mm bore diameter with 2.5 mm O.D. fiber member, in FIG. 8, for a length of 300 m. Since pressure is normally quoted in psi it has been retained here for the sake of convenience.

Coefficients of friction of around 0.5 have been measured for the polyethylene and polypropylene fiber members against a polyethylene bore wall. Therefore, with a fiber member weighing 3 gms/m we could expect to install a 300 m length with around 55 psi pressure. Any extra drag force over that required to overcome friction would appear at the start end as a gradually increasing tension on the fiber member as installation proceeds.

Figure 10:
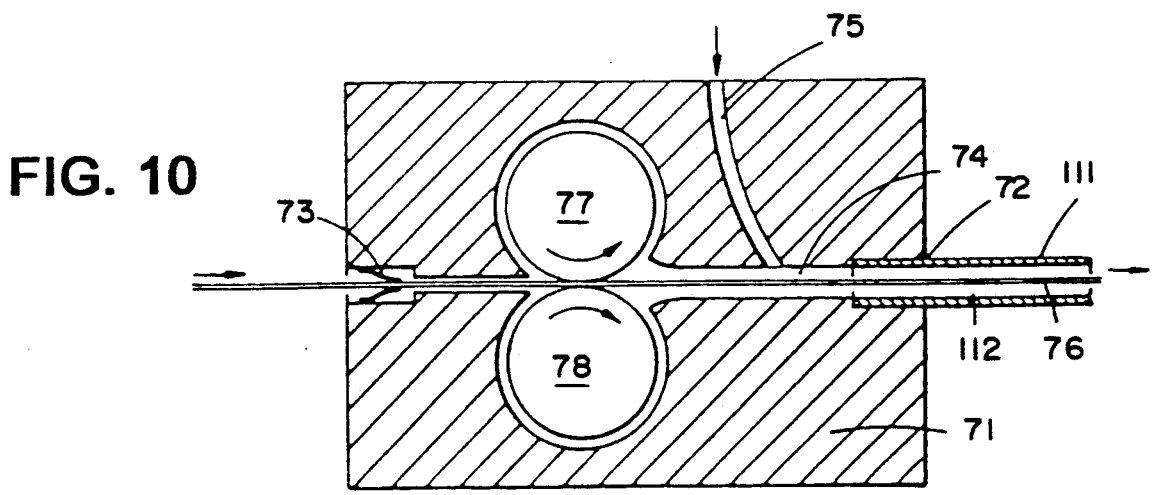
FIG. 10 is a schematic section of a modified drive unit.
Figure 11:
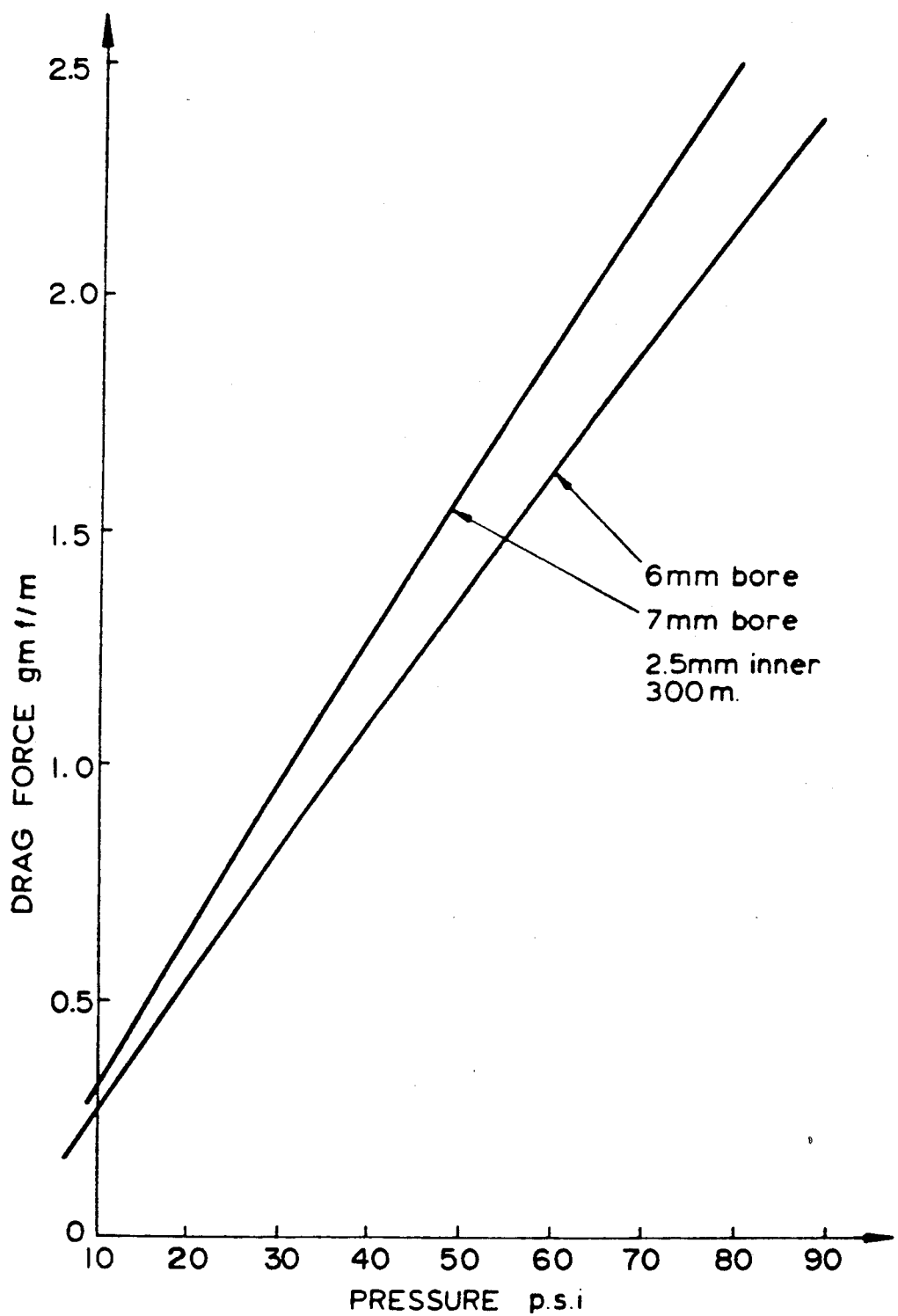
FIG. 11 is a graph of drag force vs. pressure.

FIG. 10 shows in diagrammatic form the arrangement of the modified drive unit discussed with reference to FIG. 4, in which the only major change lies in incorporating the drive wheels 77 and 78 within the feedhead 71.

As the foregoing discussion with reference to FIG. 9 has illustrated, the viscous drag force is accompanied by a hydrostatic force, the force f' of equation 5 above. This force f' has been found to oppose the insertion of the fiber member into the drive unit, making the incorporation of the drive wheels 77 and 78 into the drive unit preferable. The force f', referred above as the hydrostatic potential must be overcome when introducing the fiber member into the pressurized areas. The drive wheels would be driven by a torque just sufficient to overcome this potential.

The drive wheels are incorporated into the pressurized cavity 74 and thus the force on the fiber member necessary to overcome the hydrostatic potential is tensile. If the wheels were outside the drive unit, this force would be compressive, and there would be tendency for the fiber member to buckle.

For convenience the drive unit may be made to split along the fiber member axis, and perpendicular to the diagram, or in some other plane. The air seals 72, 73 may be, for example, rubber lips, or narrow channels.

In operation, a fiber member 76 fed into the drive unit would be automatically taken up by the drive wheels with just enough force to overcome the hydrostatic potential, and fed on along the ductlet 112. The fluid drag of the air flowing down the ductlet 112 causes the fiber member 76 to be pulled along the ductlet 112 as the installation proceeds. This means that such a drive unit can be placed between two adjoining sections of conduit so that a fiber member emerging from a ductlet in the first conduit can be fed into the appropriate ductlet of the second. Thus, an installation could consist of a fiber member 76 running through a number of conduits using two or more drive units in tandem, possibly without supervision.

It will be appreciated that it is possible to blow compounds in liquid or powder form along the ductlet prior to, or during installation in order to provide lubrication for the fiber members. Powdered talc is an example of a suitable lubricant.

The ductlets may, for example, also be formed in a power cable, or in a conventional subscriber line, to allow subsequent installation of optical fiber members. In the latter case, to avoid ingress of water, the ductlet may be sealed until the time of installation of the fiber members.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method of installing an optical fiber member along a previously installed duct in situ, said duct having a substantially continuously solid peripheral wall structure for totally enclosing said fiber member and having first and second ends, comprising the steps of:
   introducing the free end of a member having one or more optical fibers contained in a sheath having a low density foamed layer into the first end of said duct; and
   advancing the free end and following portions of said member along the duct towards the second end of the duct with the aid of viscous drag forces.

2. A method according to claim 1, further including the steps of flowing a gaseous medium within said duct toward said second and at a flow velocity substantially higher than the desired fiber member advancement rate.

3. A method according to claim 2, wherein said step of introducing said fiber member into said duct includes the step of inserting said free end of said fiber member into said flowing gaseous medium.

4. A method according to claim 3, wherein said step of advancing the member along the duct includes the step of propelling said fiber member through said duct by continuing said flowing step to produce viscous drag forces distributed along the advancing length of the fiber member then disposed within the pathway while the fiber member advances at a velocity substantially less than the gaseous flow velocity until said free end of the fiber member reaches said second end of said duct.

5. A method according to claim 4, wherein:
   said inserting and advancing step includes the step of applying an insertion force to said fiber member such that said insertion force is applied to an advancing section of the fiber member situated in the vicinity of said first end; and
   said propelling step includes applying a sufficient said insertion force to overcome hydrostatic pressure forces in the gaseous medium resisting insertion of the free end into said duct.

6. A method according to claim 4, wherein said propelling step comprises repeated discontinuous application of said flowing step.

7. A method as in claim 5, wherein said propelling step comprises repeated discontinuous application of at least one of said flowing and applying an insertion force steps.

8. A method according to claim 4, wherein said optical fiber member includes one or more optical fibers disposed within an inner sheath and an outer sheath enclosing the inner sheath, wherein the outer sheath includes said low density foamed layer and has a relatively lower density and lower modulus of elasticity than said inner sheath.

9. A method according to claim 8, wherein said outer sheath layer comprises a foamed polyethylene.

10. A method according to claim 4 wherein said viscous drag forces are of sufficient magnitude to advance said fiber member along said duct having a length of as much as several hundred meters.

11. A method of installing an optical fiber member into and along a length of a previously installed tubular pathway and having first and second ends comprising the steps of:
    flowing a gaseous medium within said tubular pathway toward said second end;
    introducing into the first end of said tubular pathway the free end of an optical fiber member having at least one optical fiber contained in a sheath having a low density, lightweight layer; and
    advancing said free end and following portions of said optical fiber member along the tubular pathway with the aid of viscous drag forces distributed along the length of the fiber member then disposed within the pathway until said free end of said fiber member has reached said second end of said pathway.

12. A method according to claim 11, wherein said optical fiber member includes a relatively high density inner sheath enclosing said at least one optical fiber and a substantially lower density, lower modulus of elasticity outer sheath, to thereby provide a relatively bulky lightweight optical fiber structure which facilitates advancement of the fiber member along said tubular pathway.

13. A method according to claim 11, wherein said sheath comprises a cellular layer of low density.

14. A method according to claim 11, wherein said sheath is comprised of a foamed layer.

15. A method according to claim 11, wherein said step of introducing said fiber member into said tubular pathway includes the step of inserting and advancing towards said second end of said tubular pathway, said free end of said fiber member into said flowing gaseous medium.

16. A method according to claim 15, wherein said step of advancing the member along the tubular pathway includes the step of propelling said fiber member through said second end of member through said tubular pathway by continuing said flowing step to produce viscous drag forces distributed along the advancing length of the fiber member then disposed within the pathway while the fiber member advances at a velocity substantially less than the gaseous flow velocity until said free end of the fiber member reaches said second end of said tubular pathway.

17. A method according to claim 16, wherein:

said inserting and advancing step includes the step of applying an insertion force to said fiber member such that said insertion force is applied to an advancing section of the fiber member situated in the vicinity of said first end; and said propelling step includes the step of applying sufficient said insertion force to overcome hydrostatic pressure forces in the gaseous medium resisting insertion of the free end into said tubular pathway.

18. A method according to claim 16, wherein said propelling step comprises repeated discontinuous application of said flowing step.

19. A method as in claim 17, wherein said propelling step comprises repeated discontinuous application of at least one of said flowing and applying an insertion force steps.

20. A method according to claim 16, wherein said optical fiber member includes one or more optical fibers disposed within an inner sheath and an outer sheath enclosing the inner sheath, wherein the outer sheath includes said low density layer and has a relatively lower density and lower modulus of elasticity than said inner sheath.

21. A method according to claim 20, wherein said outer sheath layer comprises a foamed polyethylene.

22. A method of installing an optical fiber member into and along a length of a previously installed tubular pathway having a first end and a second end remotely located from said first end, comprising the steps of:

feeding a gaseous medium into said pathway at said first end of said pathway, said gaseous medium being directed towards said second end at a flow velocity substantially higher than the desired fiber member advancement rate;

inserting into a first end of said tubular pathway a free end of a fiber member contained in a sheath having a low density, lightweight outer layer and a relatively higher density inner layer;

advancing the free end and following portions of said fiber member along said tubular pathway with the aid of viscous drag forces between said gaseous medium and said fiber member until said free end reaches said remotely located second end of said pathway.

* * * * *